United States Patent
Kasahara et al.

(10) Patent No.: US 12,115,614 B2
(45) Date of Patent: Oct. 15, 2024

(54) ON-MACHINE MEASURING METHOD AND CONTROL DEVICE OF MACHINE TOOL

(71) Applicant: MAKINO MILLING MACHINE CO., LTD., Tokyo (JP)

(72) Inventors: Tadashi Kasahara, Kanagawa (JP); Kazunari Ishii, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 1128 days.

(21) Appl. No.: 16/651,735

(22) PCT Filed: Sep. 28, 2018

(86) PCT No.: PCT/JP2018/036466
§ 371 (c)(1),
(2) Date: Mar. 27, 2020

(87) PCT Pub. No.: WO2019/066034
PCT Pub. Date: Apr. 4, 2019

(65) Prior Publication Data
US 2020/0230771 A1 Jul. 23, 2020

(30) Foreign Application Priority Data
Sep. 29, 2017 (JP) ................................. 2017-190997

(51) Int. Cl.
*B23Q 17/24* (2006.01)
*B23Q 15/14* (2006.01)
(Continued)

(52) U.S. Cl.
CPC ........... *B23Q 17/249* (2013.01); *B23Q 15/14* (2013.01); *B23Q 15/22* (2013.01); *B23Q 17/22* (2013.01);
(Continued)

(58) Field of Classification Search
CPC .... B23Q 15/22; B23Q 17/22; B23Q 17/2428; G06T 2207/30164
See application file for complete search history.

(56) References Cited

U.S. PATENT DOCUMENTS 9,830,696 B1 * 11/2017 Maurer ..................... G06T 7/60
2005/0084149 A1 * 4/2005 Aizawa .................. G01B 11/25
382/154

(Continued)

FOREIGN PATENT DOCUMENTS

JP      2008032453 A  *  2/2008
JP      2010-58239 A      3/2010
(Continued)

OTHER PUBLICATIONS

International Search Report and Written Opinion mailed Nov. 20, 2018, directed to International Application No. PCTJP2018036466; 15 pages.

*Primary Examiner* — Vincent H Tran
(74) *Attorney, Agent, or Firm* — Morrison & Foerster LLP

(57) ABSTRACT

When measuring the position of a workpiece fixed to a table of a machine tool: rotary feed axes of the machine tool are pivoted such that an upper surface of the table faces in the direction of a line of sight of a camera, and an image of the workpiece is captured; the rotary feed axes are pivoted such that a side surface of the table faces in the direction of the line of sight of an image capturing device, and an image of the workpiece is captured; and the position of the workpiece is measured on the machine tool on the basis of the captured images.

6 Claims, 5 Drawing Sheets

(51) Int. Cl.
  *B23Q 15/22*  (2006.01)
  *B23Q 17/22*  (2006.01)
  *G05B 19/29*  (2006.01)
  *G06T 7/00*   (2017.01)
  *G06T 7/73*   (2017.01)

(52) U.S. Cl.
  CPC ......... *B23Q 17/24* (2013.01); *B23Q 17/2414* (2013.01); *B23Q 17/2428* (2013.01); *G05B 19/291* (2013.01); *G06T 7/0004* (2013.01); *G06T 7/75* (2017.01); *G06T 2207/30164* (2013.01)

(56) References Cited

U.S. PATENT DOCUMENTS

| | | | |
|---|---|---|---|
| 2009/0070077 A1 | 3/2009 | Tian et al. | |
| 2010/0063617 A1 | 3/2010 | Mori et al. | |
| 2010/0299104 A1* | 11/2010 | Tamai | G01B 5/008 702/168 |
| 2015/0314450 A1* | 11/2015 | Chiu | B25J 9/1692 700/186 |
| 2016/0067819 A1* | 3/2016 | Kuki | B23K 26/364 219/121.82 |
| 2016/0246282 A1* | 8/2016 | Matsushita | G05B 19/404 |
| 2017/0017226 A1* | 1/2017 | Yamazaki | B23Q 17/2471 |
| 2017/0314910 A1* | 11/2017 | Ikebuchi | G06T 7/73 |
| 2018/0024525 A1* | 1/2018 | Inoue | G05B 19/402 700/193 |
| 2018/0032832 A1* | 2/2018 | Shen | G06K 7/10722 |
| 2018/0058840 A1* | 3/2018 | Lamendola | G01B 11/2504 |
| 2018/0089360 A1* | 3/2018 | Madsen | G05B 19/401 |
| 2018/0250784 A1* | 9/2018 | Kasahara | B23Q 3/15546 |
| 2018/0257100 A1* | 9/2018 | Yoshitomi | B05D 1/26 |
| 2018/0370027 A1* | 12/2018 | Oota | G06F 18/217 |
| 2019/0047106 A1* | 2/2019 | Böck | B23Q 17/249 |
| 2019/0061060 A1* | 2/2019 | Kamiyama | C30B 33/06 |
| 2019/0351504 A1* | 11/2019 | Reisacher | B23K 26/0006 |
| 2020/0164463 A1* | 5/2020 | Shibazaki | B23K 26/352 |
| 2020/0388053 A1* | 12/2020 | Wallack | H04N 13/282 |
| 2021/0069846 A1* | 3/2021 | Chabirand | B23Q 17/0919 |

FOREIGN PATENT DOCUMENTS

| | | |
|---|---|---|
| JP | 2010-58264 A | 3/2010 |
| WO | 2008/026722 A1 | 3/2008 |

* cited by examiner

ON-MACHINE MEASURING METHOD AND CONTROL DEVICE OF MACHINE TOOL

CROSS-REFERENCE TO RELATED APPLICATIONS

This application is a U.S. national phase patent application of International Patent Application No. PCT/JP2018/036466 filed Sep. 28, 2018, which claims the priority of Japanese Application No. 2017-190997 filed Sep. 29, 2017, which are hereby incorporated by reference in the present disclosure in their entirety.

FIELD OF THE DISCLOSURE

The present invention relates to a machine tool on-machine measurement method with which a workpiece on a machine tool can be measured and a controller for controlling a machine tool.

BACKGROUND OF THE DISCLOSURE

In machine tools which perform machining such as cutting by moving a tool relative to a workpiece, the feed axis is numerically controlled so that the tool path is specified by the coordinates of a predetermined axis or the like, and machining is performed while moving the tool with respect to the workpiece. The controller of the machine tool makes it possible to automatically machine the workpiece by changing the relative position of the tool with respect to the workpiece by moving the workpiece relative to the workpiece with the feed axis in accordance with a machining program.

Patent Literature 1 and 2 describe controllers of such machine tools which image a workpiece on the machine tool. In the invention of Patent Literature 1, a workpiece and a workpiece fixture are imaged to generate two-dimensional image data, virtual two-dimensional image data of the workpiece and the workpiece fixture is generated from data related to three-dimensional models of the workpiece and the workpiece fixture, and the two-dimensional image data and the virtual two-dimensional image data are compared to determine whether they match.

In the invention of Patent Literature 2, a workpiece affixed to a machine tool is imaged from two points of view, two-dimensional image data is generated in each point of view, shape features of the workpiece are recognized from the two sets of two-dimensional image data, the positions and postures of these shape features are calculated on three-dimensional model data of the workpiece, and three-dimensional model data including the workpiece and a part of the machine tool is generated based on the calculated positions and postures, the three-dimensional model data of the workpiece, and model data of a part of the machine tool.

PATENT LITERATURE

PTL 1 Japanese Unexamined Patent Publication (Kokai) No. 2010-058264
PTL 2 WO2008-026722

SUMMARY OF THE DISCLOSURE

Image data captured with a single-lens camera does not include data related to the depth of the imaging target, and since the workpiece is imaged from only one direction in the invention of Patent Literature 1, there is a problem in that the shape of the workpiece cannot be accurately understood. In this connection, in the invention of Patent Literature 2, though the workpiece is imaged from two points of view, two imaging devices are necessary. Furthermore, in the invention of Patent Literature 2, if the intersection of the optical axes when the workpiece is viewed from two viewpoints is not accurately calculated, there is a problem in that the error in the positions and postures of the shape features obtained from the captured image data increases. In order to accurately obtain the shape of the workpiece, in the invention of Patent Literature 2, it is necessary to accurately measure the optical axes of the imaging cameras.

An object of the present invention is to solve such problems of the prior art and to provide a machine tool on-machine measurement method and controller which enable easy and accurate measurement of the positions of a workpiece and jig affixed to a table of the machine tool.

In order to achieve the above object, according to the present invention, there is provided a machine tool on-machine measurement method for determining a position of a workpiece or jig on a table with an imaging device by changing the posture of the table with a rotary feed axis, the method comprising an upward imaging step in which the rotary feed axis is rotated to orient an upper surface of the table in a line-of-sight direction of the imaging device and the workpiece or jig is imaged with the imaging device, a side imaging step in which the rotary feed axis is rotated to orient a side surface of the table in the light-of-sight direction of the imaging device and the workpiece or jig is imaged with the imaging device, and a calculation step in which the position of the workpiece or jig is calculated by a controller of the machine tool from the images captured in the upward imaging step and the side imaging step.

Further, according to the present invention, there is provided a machine tool controller which comprises an orthogonal three-axis linear feed axis and two rotary feed axes and which determines a position of a workpiece or jig on a table with an imaging device by changing the posture of the table with the rotary feed axes, wherein the rotary feed axes are rotated to orient an upper surface of the table in a line-of-sight direction of the imaging device and the workpiece or jig is imaged with the imaging device, the rotary feed axes are rotated to orient a side surface of the table in the light-of-sight direction of the imaging device and the workpiece or jig is imaged with the imaging device, and the position of the workpiece or jig is calculated by a controller of the machine tool from the captured images.

According to the present invention, by rotating the rotary feed axis to orient the upper surface of the table in the line-of-sight direction of the imaging device and imaging the workpiece or jig with the imaging device, the position of the workpiece in the X-axis and Y-axis directions can be measured on the plane of the table. Furthermore, by rotating the rotary feed axis to orient the side surface of the table in the line-of-sight direction of the imaging device and imaging the workpiece or jig with the imaging device, the thickness of the workpiece can be measured in the direction perpendicular to the plane of the table, i.e., the Z-axis direction. Since the upper surface of the table and the side surface of the table have an angular positional relationship of 90°, the measured values are less susceptible to errors in the camera optical axis, and the position of the workpiece can be accurately measured.

DETAILED DESCRIPTION OF THE DISCLOSURE

The preferred embodiments of the present invention will be described below with reference to the attached drawings.

Figure 1:
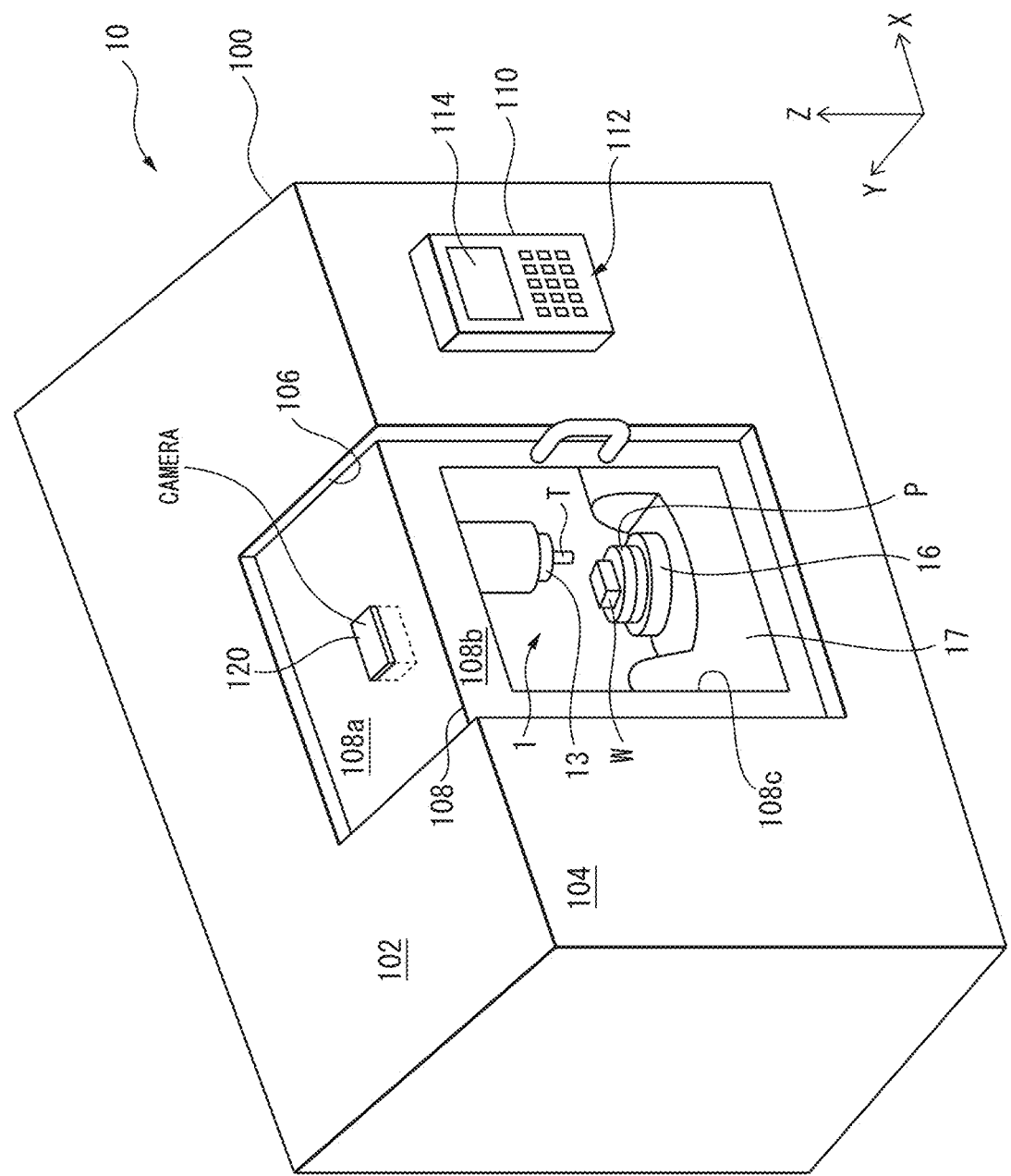
FIG. 1 is a perspective view of a machine tool according to a preferred embodiment of the present invention.
Figure 2:
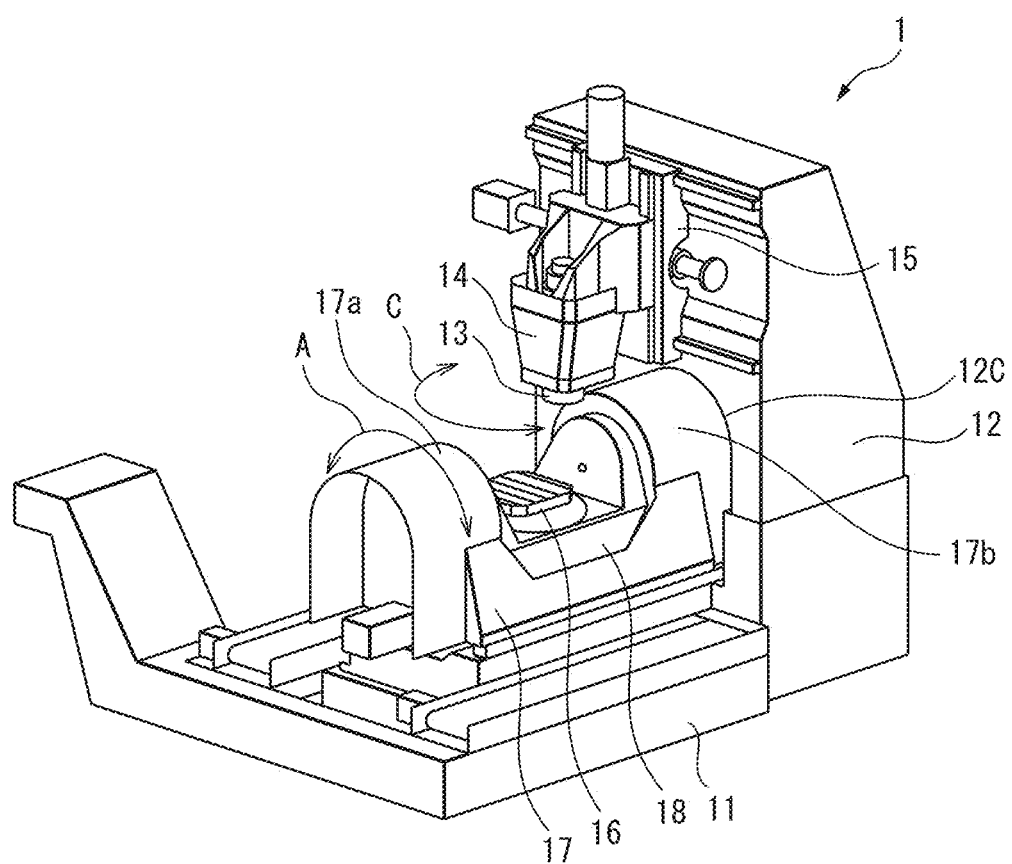
FIG. 2 is a perspective view of a machining device according to the preferred embodiment of the present invention.

First, referring to FIGS. 1 and 2, a machine tool 10 to which the present invention is applied comprises a machining device 1 enclosed within a cover 100. In the machining device 1, the horizontal left and right directions are set as the X-axis, the horizontal forward and rearward directions are set as the Y-axis, and the upward and downward directions are set as the Z-axis. In the machining device 1, the A-axis is set as the rotary feed axis about the axis extending parallel to the X-axis. In the machining device 1, the C-axis is set as the rotary feed axis about the axis extending parallel to the Z-axis. The machining device 1 comprises a bed 11 as a base, and a column 12 which stands on an upper surface of the bed 11. The machining device 1 comprises a spindle head 14 which supports a spindle 13 so as to be rotatable about a vertical axis, and a saddle 15 which supports the spindle head 14 in front of the column 12. The spindle head 14 supports the spindle 13 downwardly so that the tip of the spindle 13 faces the table 16. A tool is mounted on the tip of the spindle 13.

The machining device 1 comprises a table 16 to which a workpiece W is attached via a pallet P, and a U-shaped oscillating support member 18 which supports the table 16. The table 16 includes a clamper (not illustrated) for securing the pallet P to the table 16, and the pallet P includes an engagement part (not illustrated) which engages with the clamper. The machining device 1 comprises a U-shaped carriage 17 which supports the oscillating support member 18. The carriage 17 supports the oscillating support member 18 on a pair of posts 17a, 17b which are spaced in the X-axis direction. The oscillating support member 18 is supported so as to be capable of oscillating about the axis line of the A-axis.

The machining device 1 comprises a drive device which drives the tool relative to the workpiece based on the respective feed axes. The drive device has a servomotor 75 (FIG. 3) for each axis which drives along the respective feed axis. The drive device moves the saddle 15 in the Y-axis direction on the column 12. The drive device moves the carriage 17 in the X-axis direction on the bed 11. A cavity 12c is formed in the column 12 so that the carriage 17 can partially enter therein. Furthermore, the drive device moves the spindle head 14 in the Z-axis direction on the saddle 15. The drive device rotates the table 16 about the C-axis. Further, the drive device rotates the oscillating support member 18 about the A-axis on the carriage 17. Thus, the machining device 1 of the present embodiment is a five-axis machining device including three mutually orthogonal X-axis, Y-axis, and Z-axis linear feed axes and two A-axis and C-axis rotary feed axes.

The cover 100 includes an upper wall 102 and a front wall 104, which are flat and plate-like, and surrounds the entirety of the machining device 1. The cover 100 has an opening 106 so that the operator can access a machining space in which the machining device 1, in particular, the table 16 of the machining device 1 and the tool T on the tip of the spindle 13, are arranged. The opening 106 is formed from the upper wall 102 to the front wall 104. The cover 100 has a door 108 which opens and closes the opening 106. An operation board 110 for operating the machining device 1 is attached to the front wall 104. A plurality of buttons or input keys 112 for operating the machining device 1 and a touch panel 114 forming a display/input unit, which is described later, are arranged on the operation board 110.

The door 108 includes an upper door portion 108a which closes the portion of the opening 106 formed in the upper wall 102 of the cover 100 and a front door portion 108b which closes the portion of the opening 106 formed in the front wall 104 of the cover 100. The door 108 is substantially L-shaped and can slide in the X-axis direction. When the door 108 is in a position in which the opening 106 is closed, the upper door portion 108a, as shown in FIG. 1, is arranged above the machining space of the machining device 1, in particular, above the table 16. Furthermore, an interlock can be provided on the door 108 so that the machining device 1 can be operated only when the door 108 is in a position which the opening 106 is closed. A camera 120 which can image the table 16 of the machining device 1 is arranged on the upper door portion 108a of the door 108. An opening 108c may be formed in the front door portion 108b, and the opening 108c may be covered with a transparent plate member made from glass or a resin, whereby the machining space can be observed from the outside.

Figure 3:
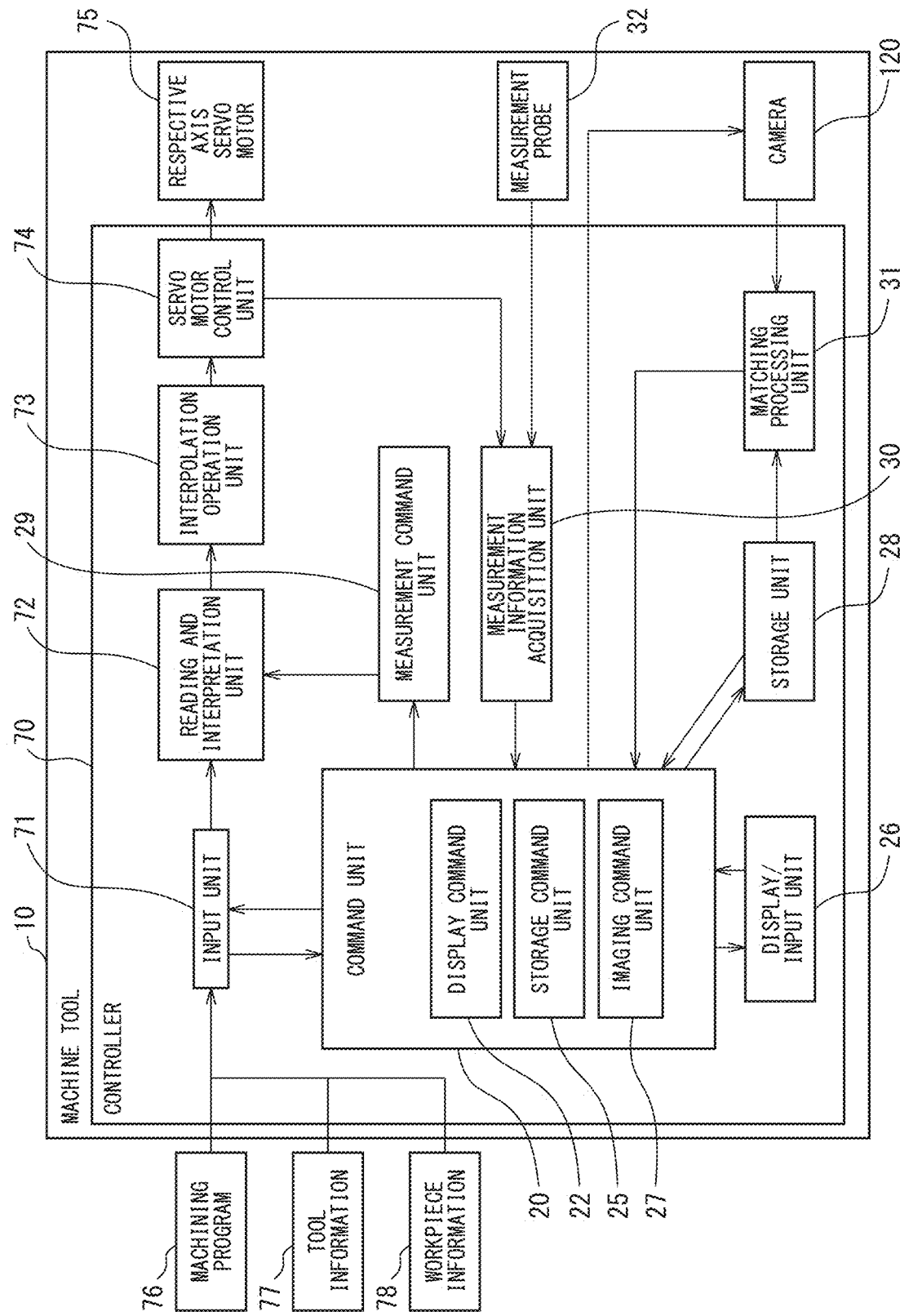
FIG. 3 is a block diagram of the machine tool according to the preferred embodiment of the present invention.

Referring to FIG. 3, the machine tool 1 comprises a controller 70 which controls the feed devices of each axis, performs machining information setting, and performs workpiece measurement. The controller 70 can be formed by, for example, a computing device comprising microprocessors, such as a CPU (Central Processing Unit), which are connected to each other via busses, a memory device such as RAM (Random Access Memory) and ROM (Read-Only Memory), an electronic data storage device such as a hard disk drive or solid-state drive (SSD), etc. The controller 70 may be formed by an NC device for the machine tool 10 or a plurality of computing devices including NC devices.

The controller 70 includes an input unit 71, a reading and interpretation unit 72, an interpolation operation unit 73, and a servomotor control unit 74. When a workpiece is machined based on the machining program 76, the operator creates the machining program 76. Alternatively, the machining program 76 can be generated by a CAM (Computer Aided Manufacturing) device, or the like, based on the target shape of the workpiece. The target shape of the workpiece can be created by, for example, a CAD (Computer Aided Design) device.

Machining information such as the machining program 76 is input into the input unit 71. The machining program 76 includes information regarding the movement of the tool relative to the workpiece. The machining program 76 contains commands for the machine tool in G-code, M-code, etc. The inputting of the machining information to the input unit 71 may be manually performed by the operator from, for example, the touch panel 114, or alternatively, electronic data including each type of data may be input via, for example, a communication network. Furthermore, machining information such as tool information 77 or workpiece information 78 is input to the input unit 71. The tool information 77 contains information related to the tool such as the type of the tool, such as a drill or end mill, the diameter of the tool, and the length of the tool. The workpiece information 78 contains information related to the to-be-machined workpiece. The information related to the workpiece includes a workpiece model, which is the three-dimensional shape of an unmachined workpiece.

The reading and interpretation unit 72 reads the machining program 76, etc., from the input unit 71. The reading and interpretation unit 72 outputs a movement command to the interpolation operation unit 73. The interpolation operation unit 73 calculates a position command value of each interpolation cycle. For example, the interpolation operation unit 73 calculates a movement amount of each time interval set based on the movement command. The interpolation operation unit 73 outputs position command values to the servomotor control unit 74. The servomotor control unit 74 outputs current values to servomotors 75 of the X-axis, Y-axis, Z-axis, A-axis, and C-axis feed axes based on the position commands. In order for the servomotor control unit 74 to perform servo control on each servomotor 75, a linear position measurement device (not illustrated), such as a digital scale, is arranged on each of the X-axis, Y-axis, and Z-axis feed axes, and a rotary position measurement device (not illustrated), such as a rotary encoder attached to the servomotor 75 of each axis, is arranged on the A-axis and C-axis rotary feed axes, and the positions of each of the X-axis, Y-axis, Z-axis, A-axis, and C-axis feed axes is fed back to the servomotor control unit 74.

The machine tool 10 carries out machining based on each type of machining information. In addition to the machining program 76, the tool information 77, and the workpiece information 78 described above, coordinate information is included as machining information related to machining. The coordinate information contains information on the coordinates used in the machining program 76. A machine coordinate system in which a predetermined point on the machine tool serves as the origin and a workpiece coordinate system in which an arbitrary point on the workpiece serves as the origin are set in the coordinate system of the machine tool. The workpiece coordinate system moves along with the movement of the workpiece. The workpiece coordinate system can be determined by setting a position relative to the machine coordinate system. The coordinate information contains information on other coordinates different from the machine coordinate system. Furthermore, when a plurality of coordinate systems are used in the machining program 76, information on the plurality of coordinate systems in contained in the coordinate information.

The machining information can contain controller parameters. For example, information on machining conditions specified with the operation board 110 can be contained in the machining information. Examples of such machining conditions can include override values related to movement speed. Furthermore, information related to coolant or the like can be contained as machining conditions.

The controller 70 of the machine tool 10 according to the present embodiment further includes a command unit 20, a display/input unit 26 for displaying of machining information and inputting data or commands by the operator the tapping or clicking icons on the touch panel 114, a storage unit 28 which stores the machining information and the workpiece information, a measurement command unit 29, a measurement information acquisition unit 30, and a matching processing unit 31.

The command unit 20 generates the machining information for performing machining and outputs it to the input unit 71. Furthermore, when the operator operates the display/input unit 26 (touch panel 114), the command unit 20 edits the machining information input to the input unit 71 and outputs the machining information to the input unit 71 as new machining information. For example, the machining program input to the input unit 71 is edited and output to the input unit 71 as the machining program for current machining. Furthermore, the machining information input with the operation board 110 such as the override values is received by the command unit 20. Thus, the command unit 20 can newly create or edit the machining information.

Figure 4A:
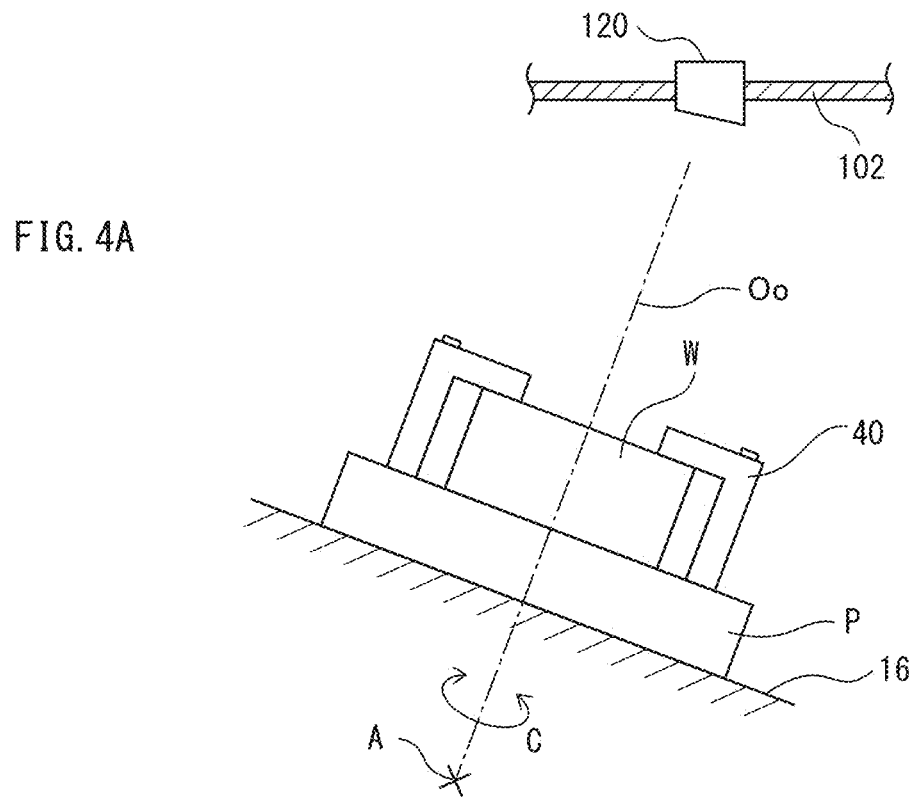
FIG. 4A and FIG. 4B are schematic views illustrating imaging methods.
Figure 4B:
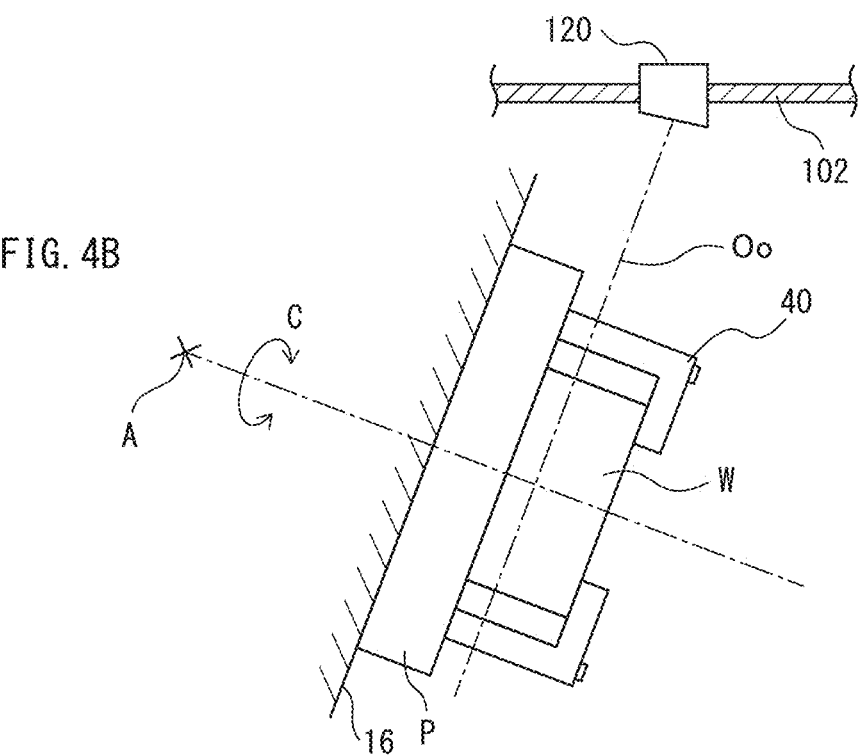

The command unit 20 includes a display command unit 22, a storage command unit 25, and an imaging command unit 27. The storage command unit 25 stores the newly generated machining information or the edited machining information in the storage unit 28 formed by the ROM or storage device. The display/input unit 26 displays the machining information based on the command of the display command unit 22. Furthermore, when the operator operates the touch panel 114, each type of command or information is input from the display/input unit 26. As shown in FIGS. 4A and 4B, when the table 16 and workpiece W are in the first imaging position or the second imaging position, the imaging command unit 27 outputs an imaging command indicating that an image is to be capture to the camera 120. Furthermore, the imaging command can be output to the camera 120 only when the door 108 is closed by a signal from the interlock.

It should be noted that though the storage unit 28 of the present embodiment is arranged in the controller 70, the storage unit 28 is not limited thereto, and the storage unit 28 may be arranged outside the controller 70. For example, a storage unit such as a memory card or hard disk may be connected to the controller via a communication network.

The controller 70 includes a measurement command unit 29. The instructions of the measurement of the workpiece are output from the command unit 20 to the measurement command unit 29. The measurement command unit 29 outputs a command for a predetermined measurement to the reading and interpretation unit 72 and measurement of the workpiece on the machine tool 10 is performed.

The controller 70 includes a measurement information acquisition unit 30. The measurement information acquisition unit 30 acquires information when measurement of the workpiece or the like is carried out. The measurement information acquisition unit 30 receives a signal from a measurement probe 32 mounted on the tip of the spindle 13. Furthermore, the measurement information acquisition unit 30 receives coordinate values of the machine coordinate system from the servomotor control unit 74. Further, the measurement information acquisition unit 30 outputs this information to the command unit 20. The measurement information acquisition unit 30 outputs a skip signal, which is output when the measurement probe 32 comes into contact with the workpiece, and coordinate values of each axis at that time in the machine coordinate system to the command unit 20. The machining information can be calculated by the command unit 20 as needed from the measurement values and displayed on the display/input unit 26.

Figure 5:
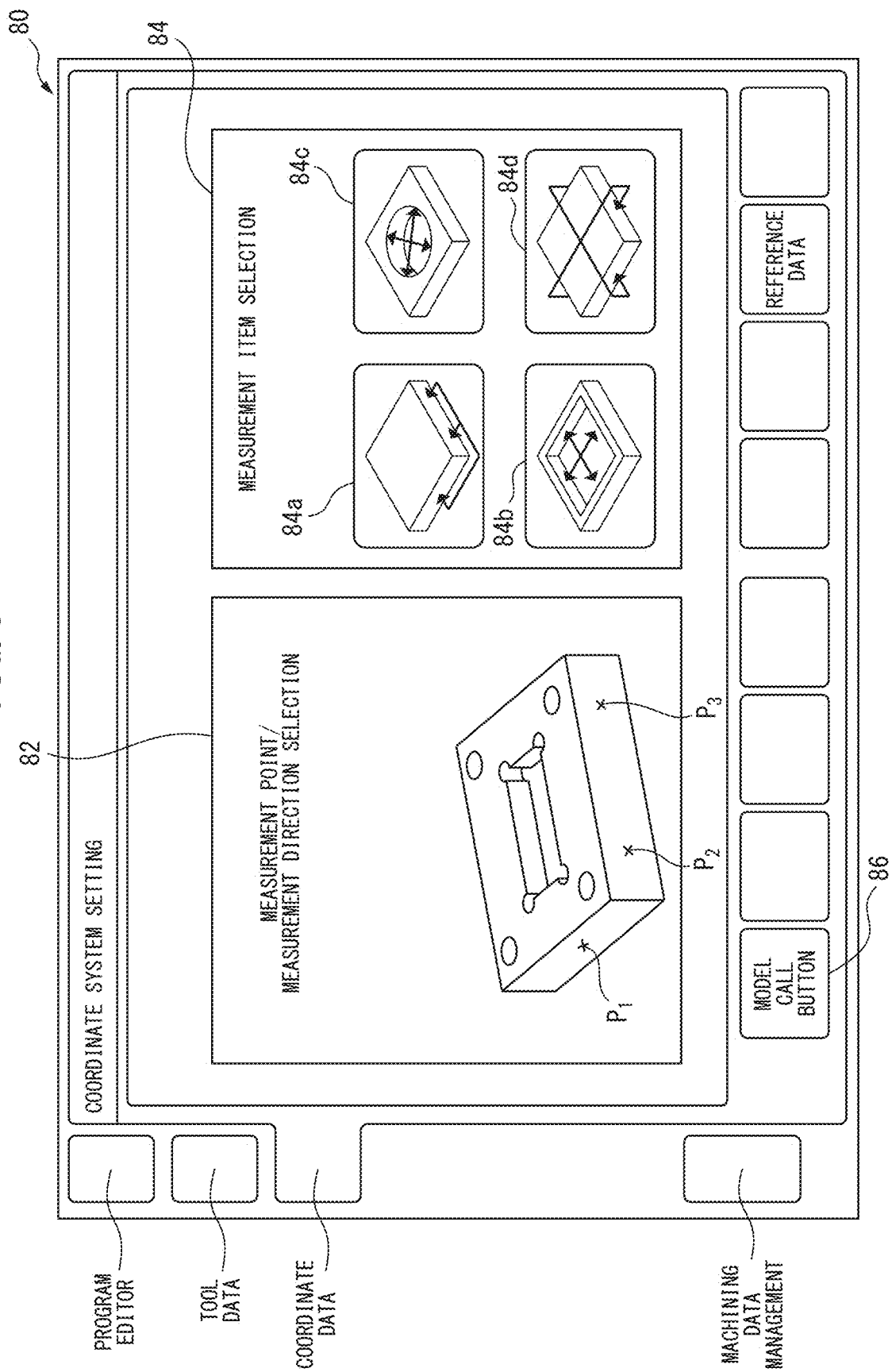
FIG. 5 is a view showing a measurement screen.

The operations of the present embodiment will be described below with reference to FIGS. 4A, 4B, and 5.

As described above, the workpiece W is attached to the pallet P by a jig 40, and the pallet P is affixed to the table 16. When the workpiece W is attached to the pallet P, the position of the workpiece on the pallet P may shift slightly in some cases. Furthermore, the offset value of the workpiece coordinate system with respect to the machine coordinate system may change in some cases. Thus, the coordinate information is also measured each time prior to the start of machining.

The machine tool 10 of the present embodiment is configured so that measurement of a workpiece can be carried out before the start of machining. By measuring the position of the workpiece, for example, the offset values of the workpiece coordinate system with respect to the machine coordinate system can be corrected. The machine tool 10 according to the present embodiment is configured such that a manual or automatic method for measuring the workpiece can be selected. A screen and a measurement program which support measurement when measurement is carried out automatically are stored in the storage unit 28. Furthermore, a screen for supporting measurement when measurement is carried out manually is stored in the storage unit 28.

When automatic measurement of the workpiece is performed, by operating, for example, the buttons or the input keys 112 of the operation board 110, a workpiece measurement screen 80 (FIG. 5) corresponding to automatic measurement of the workpiece is displayed on the display/input unit 26. The workpiece measurement screen 80 includes a measurement point/measurement direction selection area 82, a measurement item selection area 84, and a plurality of call buttons including a model call button 86. When the operator taps or clicks the model call button 86, a model shape of the to-be-machined workpiece, which is the measurement target, is output from the storage unit 28 to the display command unit 22 of the command unit 20 and is displayed in the measurement point/measurement direction selection area 82. As a result, the operator can tap or click predetermined positions P1 to P3 of the workpiece shape displayed in the measurement point/measurement direction selection area 82 on the touch panel 114, whereby the measurement points on the workpiece or the measurement direction of the workpiece can be set.

A plurality of measurement method selection icons 84a to 84d representing workpiece measurement methods are displayed in the measurement item selection area 84. For example, icon 84a is an icon for measuring the angles of two side surfaces of the workpiece with respect to the machine coordinate system, icon 84b is an icon for measuring the lengths of two opposing sides of a rectangular recess formed in the workpiece, 84c is an icon for measuring the inner diameter of a circular recess formed in the workpiece, and icon 84d is an icon for measuring the lengths of two opposing sides of a rectangular workpiece. Measurement according to each measurement method is selected when the operator selects, by tapping or clicking, one of the measurement method selection icons 84a to 84d on the touch panel 114.

When the operator presses a measurement start button (not illustrated) on the operation board 110, measurement of the workpiece W in accordance with the selected measurement method starts. First, a command to move the workpiece W to a predetermined measurement position is output from the measurement command unit 29 to the reading and interpretation unit 72 based on the command from the command unit 20. When the workpiece W arrives at the measurement position, the measurement command unit 29 outputs to the reading and interpretation unit 72 a command to rotate the A-axis to move the workpiece W to the first imaging position. The first imaging position, as shown in FIG. 4A, is a position in which the workpiece attachment surface of the table 16 faces the camera 120 along the optical axis $O_0$ of the camera 120, which is the line of sight of the imaging device. As a result, the upper surfaces of the workpiece W and the jig 40 face the camera 120.

When the workpiece W arrives at the first imaging position, the imaging command unit 27 outputs an imaging command to the camera 120 which then images the workpiece W in the first imaging position. Since the upper surface of the workpiece W faces the camera 120 along the optical axis $O_0$ in the first imaging position at this time, the plane of the workpiece W is imaged. The image data of the imaged workpiece W is output to the storage unit 28 and stored in the storage unit 28.

When imaging of the workpiece W in the first imaging position is complete, the measurement command unit 29 outputs to the reading and interpretation unit 72 a command to move the workpiece W to the second imaging position. The second imaging position is a position rotated by 90° in the A-axis direction from the first imaging position. As a result, the side surfaces of the table 16, the workpiece W, and the jig 40 face the camera 120 along the optical axis $O_0$.

When the workpiece W arrives at the second imaging position, the imaging command unit 27 outputs an imaging command to the camera 120 and the workpiece W is imaged in the second imaging position. Since the side surface of the workpiece W faces the camera 120 along the optical axis $O_0$ in the second imaging position at this time, the side surface of the workpiece W is imaged. The image data of the imaged workpiece W is output to the storage unit 28 and stored in the storage unit 28. A plurality of side surfaces of the workpiece W may be imaged by repeatedly feeding the table 16 by a predetermined angle about the C-axis direction and imaging the other side surfaces of the workpiece W. As a result, even when, for example, a clear image cannot be obtained due to halation on a specific side surface of workpiece W, it is possible to obtain a side surface suitable for processing.

Next, the image data of the imaged workpiece W is parsed in the matching processing unit 31, and the shape and dimensions of the plane and the shape and dimensions of the side surface of the workpiece W including the jig 40 are determined by calculation. For example, the shape of the workpiece W can be obtained by extracting image edge pixels after binarizing the image data. The size of the workpiece W can be obtained by counting the number of pixels in the X-axis and Y-axis directions.

Further, by comparing the image data of the workpiece W with the three-dimensional model shape using known matching processing, the characteristic portions of the workpiece W, in particular the position of the origin position set on the workpiece W in the matching coordinate system, and specifically, X-axis, Y-axis, and Z-axis direction deviations as well as the rotational position of the workpiece W about the C axis with respect to the machine coordinate system, the inclination of the workpiece coordinate system with respect to the machine coordinate system, or A-axis and/or C-axis direction deviation, can be determined by calculation.

When the dimensions, shape, and position of the workpiece are measured in this manner, the measurement command unit 29 outputs to the reading and interpretation unit 72 a measurement command to perform more precise measurement of the workpiece W using the measurement probe 32 in accordance with a measurement program which describes the measurement method selected as a result of the operator tapping or clicking the icons 84a to 84d in the measurement item selection area 84. At that time, the measurement probe can be rapidly moved to a position near the workpiece W using the dimensions, shape, and position of the workpiece W obtained by imaging the workpiece W. Specifically, though measurement of the workpiece W using the measurement probe 32 in this manner has been conventionally known, there is a problem in moving the measurement probe 32 to the measurement start position. The operation of measuring the workpiece W by bringing the measurement probe 32 into contact with the workpiece W must be performed at a low speed in order to prevent breakage of the machine tool or the workpiece W. However, until the measurement probe 32 is brought into contact with the workpiece W, the controller of the machine tool cannot know where the workpiece W is, and cannot know where contact is established. Thus, the measurement probe 32 approaches the workpiece W at a low speed from a sufficiently distant position, and the measurement probe 32 is brought into contact with the workpiece W over time while exploring the position of the workpiece W. Alternatively, the operator manually moves the measurement probe 32 to the vicinity of the workpiece W while visually observing each measurement location, and thereafter brings the measurement probe 32 and the workpiece W into contact with each other at a low speed. Thus, the measurement of the workpiece W requires a significant amount of operator time or labor. In the present embodiment, since the dimensions, shape, and orientation of the workpiece W are known from the image data of the workpiece W obtained by the camera 120 prior to measurement by the measurement probe 32, as described above, the measurement probe 32 can be automatically moved to the vicinity of the workpiece W at a high speed.

The measurement command unit 29 sets a position to which the measurement probe 32 is moved relative to the workpiece based on the dimensions, shape, and position of the workpiece W obtained by the image of the workpiece W. Further, the probe 32 contacts the end surface of the workpiece W, as shown in the measurement point/measurement direction selection area 82, in accordance with the command of the measurement command unit 29. The measurement information acquisition unit 30 acquires the coordinate values of the machine coordinate system when the probe 32 contacts the end surface of the workpiece W, and based thereon, measures the actual position and angular position of the workpiece W more precisely.

REFERENCE SIGNS LIST

1 Machining Device
13 Spindle
16 Table
17 Carriage
18 Oscillating Support Member
20 Command Unit
22 Display Command Unit
25 Storage Command Unit
26 Display/Input Unit
27 Imaging Command Unit
28 Storage Unit
29 Measurement Command Unit
30 Measurement Information Acquisition Unit
31 Matching Processing Unit
70 Controller
71 Input Unit
72 Reading And Interpretation Unit
73 Interpolation Operation Unit
74 Servomotor Control Unit
80 Workpiece Measurement Screen
82 Measurement Point/Measurement Direction Selection Area
84 Measurement Item Selection Area
86 Button
100 Cover
108 Door
110 Operation Board
120 Camera
W Workpiece

The invention claimed is:

1. A machine tool on-machine measurement method for determining a position of a workpiece or jig on a table with an imaging device by changing the posture of the table with a rotary feed axis, wherein the table is enclosed within a cover and the imaging device is arranged on the cover, the method comprising:
an upward imaging step in which the rotary feed axis is rotated to move the table to a first imaging position so as to orient an upper surface of the table perpendicular to a line-of-sight direction of the imaging device and the workpiece or jig is imaged with the imaging device,
a side imaging step in which the rotary feed axis is rotated to move the table to a second imaging position so as to orient the upper surface of the table parallel to the line-of-sight direction of the imaging device and the workpiece or jig is imaged with the imaging device, and
a calculation step in which the position and a height of the workpiece or jig are calculated by a controller of the machine tool from the images captured in the upward imaging step and the side imaging step
wherein the calculation step further comprises the steps of:
extracting image edge pixels from the images,
measuring the position of the workpiece or the jig by counting the number of pixels of the image captured in the upward imaging step, and
measuring the height of the workpiece or the jig in the direction perpendicular to the upper surface of the table by counting the number of the pixels of the image captured in the side imaging step.

2. The machine tool on-machine measurement method of claim 1, wherein the machine tool comprises an orthogonal three-axis linear feed axis and two rotary feed axes.

3. The machine tool on-machine measurement method of claim 1, wherein the imaging device is arranged above a machining area of the machine tool.

4. The machine tool on-machine measurement method of claim 1, wherein three-dimensional shape data of a to-be-machined workpiece prior to machining is prepared, and an origin position set on the workpiece is determined by comparing captured image data and the three-dimensional shape data by matching processing.

5. The machine tool on-machine measurement method of claim 4, wherein three-dimensional shape data of a to-be-machined workpiece prior to machining is prepared, and deviation of a workpiece coordinate system from a machine coordinate system of the machine tool is measured by comparing captured image data with the three-dimensional shape data by matching processing.

6. A machine tool controller which comprises an orthogonal three-axis linear feed axis and two rotary feed axes and which determines a position of a workpiece or jig on a table with an imaging device by changing the posture of the table with the rotary feed axes, wherein the table is enclosed within a cover and the imaging device is arranged on the cover and
the rotary feed axes are rotated to move the table to a first imaging position so as to orient an upper surface of the table perpendicular to a line-of-sight direction of the imaging device and the workpiece or jig is imaged with the imaging device, the rotary feed axes are rotated to move the table to a second imaging position so as to orient the upper surface of the table parallel to the line-of-sight direction of the imaging device and the workpiece or jig is imaged with the imaging device, the position and a height of the workpiece or jig are calculated by a controller of the machine tool from the captured images, wherein calculating the position and the height comprises:

extracting image edge pixels from the images, measuring the position of the workpiece or jig by counting the number of pixels of the image captured at the first imaging position, and measuring the height of the workpiece or the jig in the direction perpendicular to the upper surface of the table by counting the number of pixels of the image captured at the second imaging position.

\* \* \* \* \*